United States Patent [19]

Gaugel et al.

[11] Patent Number: 4,479,072

[45] Date of Patent: Oct. 23, 1984

[54] SEALED-BEAM HEADLAMP HAVING SEATING ABUTMENT ON THE OUTSIDE OF CONCAVE REFLECTOR

[75] Inventors: Manfred Gaugel, Fürstenfeldbruck; Walter Schönherr, Giengen, both of Fed. Rep. of Germany

[73] Assignee: Patent Truehand-Gesellschaft fur elektrische Gluhlampen mbH, Munich, Fed. Rep. of Germany

[21] Appl. No.: 335,187

[22] Filed: Dec. 28, 1981

[30] Foreign Application Priority Data

Jan. 20, 1981 [DE] Fed. Rep. of Germany ....... 3101640

[51] Int. Cl.³ ......................... H01K 1/28; H01K 3/12; H01K 1/46; H01G 1/14

[52] U.S. Cl. .................................... 313/113; 313/318; 313/579; 445/27; 362/310

[58] Field of Search ............... 313/113, 115, 318, 579; 445/27; 362/267, 306, 310

[56] References Cited

U.S. PATENT DOCUMENTS

| | | | |
|---|---|---|---|
| 4,287,448 | 9/1981 | Bradley | 313/113 |
| 4,310,772 | 1/1982 | Tyler et al. | 313/318 X |
| 4,336,578 | 6/1982 | Bradley et al. | 362/310 |
| 4,339,685 | 7/1982 | Saguchi et al. | 313/318 X |
| 4,342,142 | 8/1982 | Nieda et al. | 445/27 X |
| 4,370,587 | 1/1983 | Notelteirs | 313/113 |

*Primary Examiner*—Palmer Demeo
*Assistant Examiner*—Sandra L. O'Shea
*Attorney, Agent, or Firm*—Frishauf, Holtz, Goodman & Woodward

[57] ABSTRACT

To accurately position a halogen cycle incandescent lamp within a reflector to form a sealed-beam headlight, a carrier is provided for the lamp with a seating surface thereon, the lamp being accurately positioned and aligned with respect to the carrier and its seating surface by optical alignment outside of the reflector, the seating surface then being fitted against a matching abutment forming a locating surface on the reflector, the lamp-carrier subassembly being secured in the reflector, for example by form-fitting interengagement, adhesion, or the like. The reflector may have a large opening and the carrier in form of a disk, or smaller openings and the carrier in form of a ring inserted from the reflector end into the reflector.

11 Claims, 9 Drawing Figures

SEALED-BEAM HEADLAMP HAVING SEATING ABUTMENT ON THE OUTSIDE OF CONCAVE REFLECTOR

The invention relates to sealed-beam headlamps, and more particularly to automotive-type headlamps.

THE INVENTION

It is an object to provide headlamps of this type whose construction is simpler and which may be more readily manufactured.

Briefly, the electric lamp of such a headlight is preadjusted relative to a lamp carrier and is fixed on it and the structural unit so provided is inserted in the reflector of the headlight such that the lamp is fixed in the desired position relative to the reflector as a consequence of the interplay of the preadjustment of the lamp with the respective matching in the design and the dimensioning of the lamp carrier and the reflector to one another.

DRAWINGS

Figure 1:
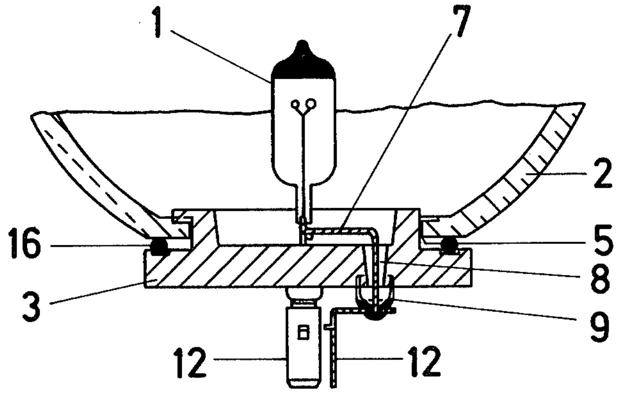
FIG. 1 is a sectional view of a first embodiment of the invention.
Figure 4:
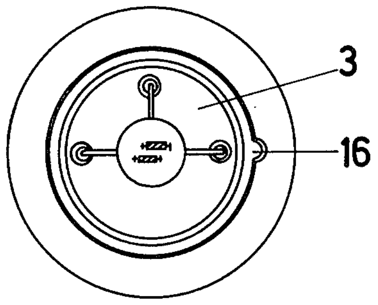
FIG. 4 shows a top view of the lamp carrier of the embodiment of FIG. 2.
Figure 6:
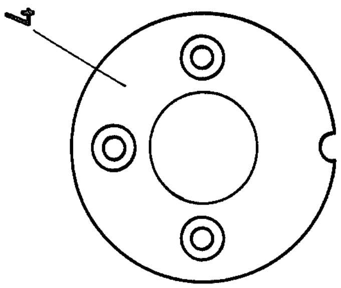
FIG. 6 is a top view of the annular lamp carrier of FIG. 5.
Figure 5:
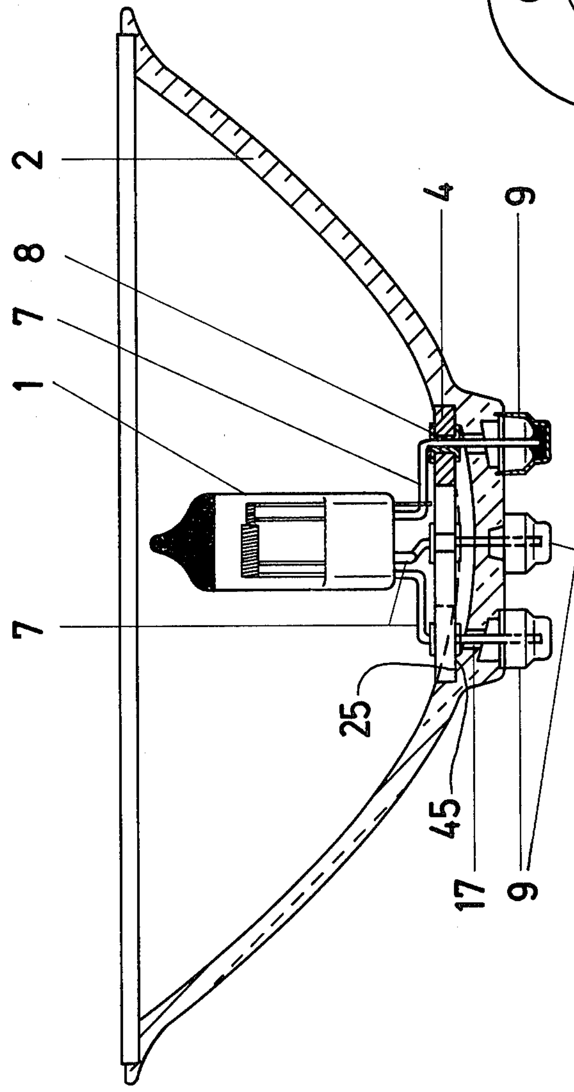
FIG. 5 is a sectional view of a third embodiment of the invention.

Throughout the Figures, the numeral 1 designates the electric lamp, shown as a halogen cycle incandescent lamp having one or two filaments; 2 designates the headlamp reflector, for instance the reflector of a sealed-beam headlight for motor vehicles having a light distribution in accordance with SAE (Society of Automotive Engineers) specifications, which requires a reflective surface sealed in the lamp, i.e. at the concave side of the reflector (not separately shown), and equipped with the halogen cycle incandescent lamp 1. The reflector 2 may be made of glass, metal or plastic. A lamp carrier, which may have the shape of a disk 3 (FIGS. 1, 2) or of a ring 4 (FIGS. 5, 6), supports lamp 1. Glass, plastic or ceramic are suitable as the material for the lamp carrier. Disk 3 or ring 4, respectively, are attached to the lamp 1 to form a structural unit or assembly. Depending on the embodiment, the structural unit is inserted into the reflector from its rear (FIGS. 1–4) or from the front (FIGS. 5, 6); i.e. the structural unit is inserted from open or front end, or from the side of the reflective area (FIG. 5). In FIG. 1, the reflector is provided with a suitable opening 5 and has a locating surface 23 to fit a seating surface 33 on carrier 3, 4.

The invention is shown in FIG. 5; the cup-shaped or concave reflector need not have an opening receiving the structural unit at the apex. The reflector is formed with a locating surface 25, positioned at the inner region of the concave reflector, as shown in FIG. 5, adjacent the apex, to fit a matching seating surface 45 on carrier 3, or 4, respectively.

Figure 7:
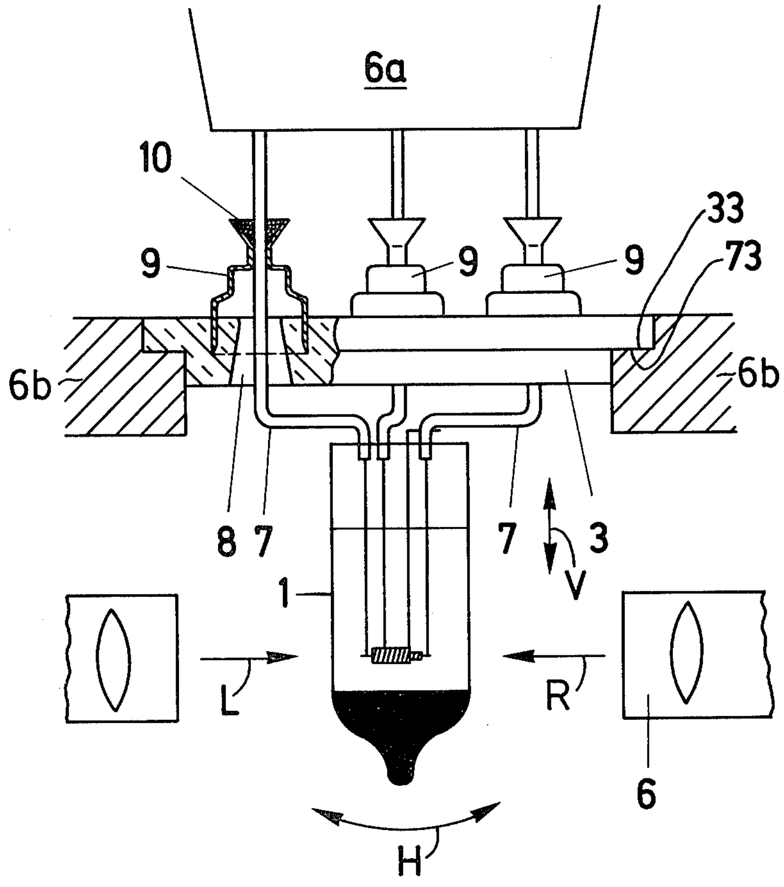
FIG. 7 shows the preadjustment of the lamp with emphasis on a metal sealing cap which permits the fixing of the lamp by soldering.
Figure 8:
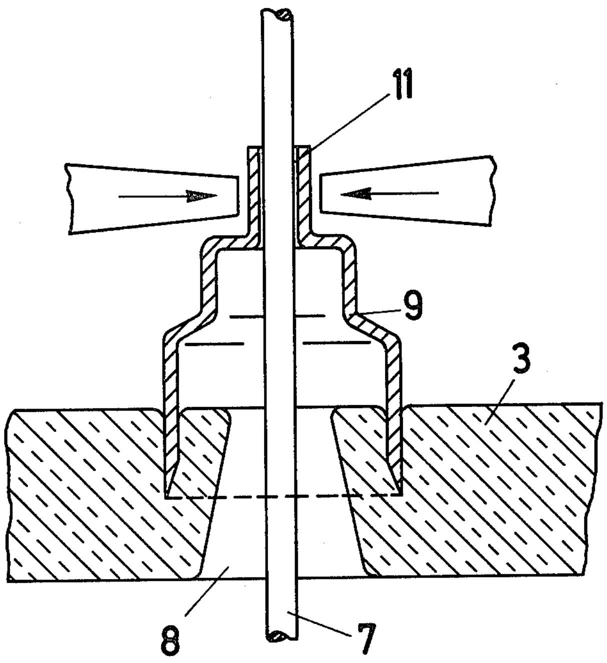
FIG. 8 shows a metal sealing cap which permits the fixing of the lamp by spot welding.
Figure 9:
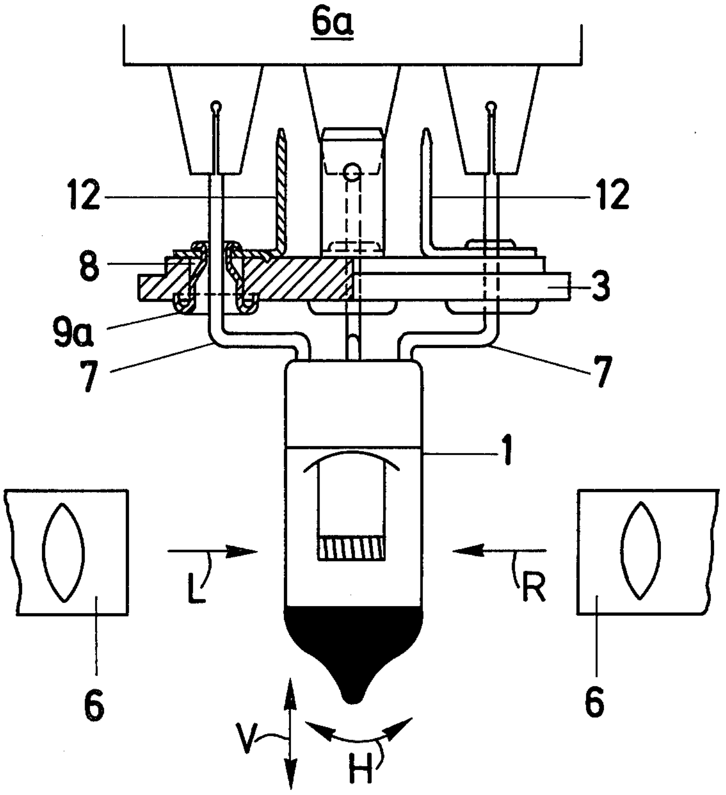
FIG. 9 shows the preadjustment of the lamp with emphasis on a tubular rivet which permits the fixing of the lamp by soldering and enables an attachment of contact lugs already prior to the adjustment.

The lamp is adjusted relative to the carrier to assume a predetermined position with respect thereto and is secured to the carrier in the said position. The adjusting of the lamp is preferably effected in a suspended position. Referring to FIGS. 7 and 9, the lamp is held in an adjustment head or support *6a*. The carrier 3, 4 is held in a holder *6b* having a locating surface 73 similar to surface 23 (FIG. 3) or 25 (FIG. 5). An adjustment optics, designated by numeral 6, which receives light signals which control adjustment motions illustrated by arrows V, H, and R, L (FIGS. 7 and 9), is provided to control alignment of the position of the lamp in the carrier 3, 4. The adjusted lamp 1 is threaded with its external lead-in wires 7 into openings 8 of the lamp carrier, or support wires are passed through the openings to which the lamp is welded with its external lead-in wires. Metal sealing caps or ferrules 9, through which extend the lead-in wires or the support wires, respectively, are flush with the openings. The metal sealing caps which are inserted in the lamp carrier, for instance by melting, have the lead-in wires either hard-soldered thereto—in which case the metal sealing caps may be provided with a conical enlargement 10 (FIG. 7) for the reception of solder—or the lead-in wires may be spot-welded thereto when metal sealing caps with a tubular end piece 11 (FIG. 8) are used. To enhance the seal, a soft-solder coating may be provided in addition, or a silicone varnish coating may be applied finally. Contact lugs 12 are affixed to the metal sealing caps, if required by hermetical soldering.

Figure 2:
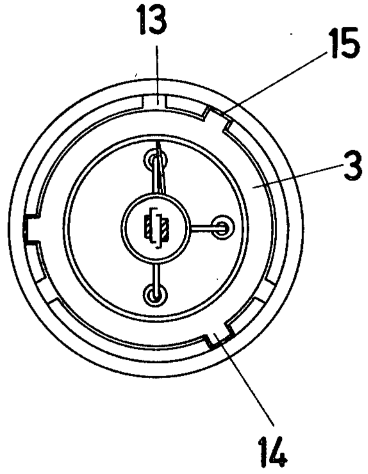
FIG. 2 is a top view of the lamp carrier of the embodiment of FIG. 1 engaging the reflector.
Figure 3:
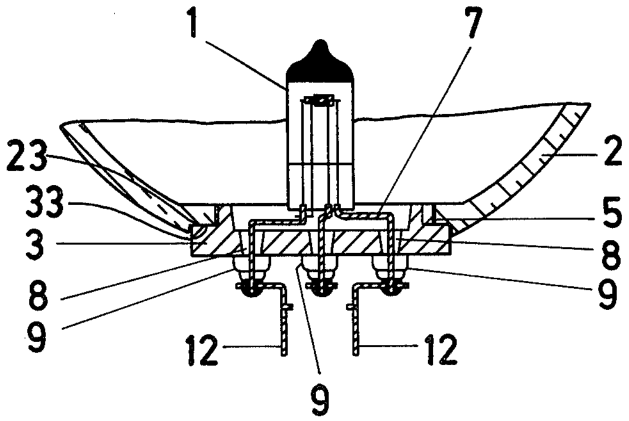
FIG. 3 is a sectional view of a second embodiment of the invention.

Special tubular rivets 9*a* (FIG. 9) may be used instead of the metal sealing caps. Whereas the contact lugs are not affixed until after the adjustment when the metal sealing caps 9 are used, the embodiment shown of the tubular rivet permits the affixing of the contact lugs already prior to the adjustment of the lamp 1. Insofar as flames are used for soldering, the lamp carrier may be protected by a ceramic disk which only comprises apertures for the tubular rivet and contact lug. In this case, the lamp carrier is made of plastic; it is also conceivable to use glass. With respect to the desired end position of the lamp in the headlamp and considering the preadjustment of the lamp, the lamp carrier and the headlamp reflector are designed with cooperating fitting surfaces 23, 33 (FIG. 3) and 25, 45 (FIG. 5). The bond may be effected by form and/or press-fitting, adhesion or glueing (FIG. 3) or ultrasonic welding. In the case of form-fitting, the lamp carrier is designed as illustrated in FIGS. 1 and 2, and the reflector opening 5 is provided with notches 13 through which project the fixing and attaching flaps 14 of the lamp carrier, disk 3. After the insertion of the structural unit of lamp carrier and lamp 1 in the reflector (glass), the structural unit is turned until the flaps 14 lie in the locking and fixing notches 15. A gasket ring 16 serves to seal off the internal space of the reflector from the exterior. In the case of adhesion, the lamp carrier is designed as illustrated in FIGS. 3 and 4, and the space left over after insertion into the reflector between the lamp carrier and the reflector is filled with glue, adhesive, or cement. An attachment lug is designated by the numeral 8.

In accordance with FIG. 5, the lamp carrier, in the Figure the ring 4, e.g. of plastic, is also provided with tubular rivets. These may be of a simpler design since, owing to the insertion of the lamp carrier from the reflective side no contact lugs need to be attached to the tubular rivets in this case and a seal function is not required. Neither is glueing or form-fitting of the lamp carrier and the reflector required in the embodiment in accordance with FIG. 5. The fitted unit is supported by soldering the ends of the lead-in wires 7 in the metal sealing caps 9 of cup shape which are cut in the reflector material. Instead of the large opening (5) required in accordance with the embodiments of FIGS. 1 to 4, the reflector has only small openings 17 through which extend the lead-in wires 7. The lead-in wires 7 may be made of round material and thus be manufactured as a round wire, thay may also be made, as far as suitable, of a flat material and thus have a flat or strip or blade profile. With suitable shaping, the lead-in wires of flat metal may function at the same time as contact lugs. The shape and, as far as required, the position of the tubular rivet would have to be accordingly matched to these lead-in wires.

The separate carrier element, disk 3 or ring 4, respectively, permits alignment of the lamp outside of the reflector, and thus accurate positioning within the reflector. If the lamp is placed within the reflector before alignment, adjustment is difficult, since the position of the lamp filament and the elements within the lamp must be precisely arranged with respect to the reflector, so as to have the appropriate light pattern. By placing the lamp on a carrier, the adjustment can readily be effected—see FIGS. 7 and 9—by moving the lamp, held in the support *6a,* in accordance with the light received by the optics 6 in various positions of freedom—vertically, in accordance with the double arrow V, in a tipping or tilting direction, double arrow H, and physically to the left or right, arrows L and R. By energizing the lamp and measuring the light by the optics 6, precise positioning of the lamp with respect to the carrier can thus be effected. This procedure can be carried out automatically and rapidly. The lamp is then sealed in position on the carrier, and assembled to the reflector, the desired position within the reflector then being determined by the optical position of the lamp on the carrier and the matching surfaces 23, 33 and 25, 45, respectively (FIGS. 3, 5) determining then the accurate positioning of the filaments of the lamp within the reflector. Merely positioning the lamp in the reflector without actual optical alignment requires precise prepositioning of the components of the lamp within the lamp structure and close tolerances of positioning the lamp in the reflector, without being able to measure the actual light output upon positioning of the lamp. The intermediate carrier element permits commercial tolerances within the lamp since alignment of the lamp with respect to the reflector—which must be accurate—is carried out by alignment of the lamp 1 on the carrier 3 or 4, respectively, which can be carried out optically, and after the lamp is made. The mechanical alignment of the carrier with the reflector, then, is a simple matter.

Various changes and modifications may be made, and features described in connection with any one of the embodiments may be used with any of the others, within the scope of the inventive concept.

We claim:

1. Sealed-beam headlamp having
- an electric lamp (1) and a concave reflector (2), formed at its base with a seating abutment, and having a reflective surface at the inner, or concave side thereof,
- a lamp carrier element (3, 4) having a seating surface (45) fitting against the seating abutment on the reflector (2),
- the lamp (1) being secured to the carrier element in predetermined aligned position with respect to said seating surface;
- and wherein the abutment defines a locating surface (25) on the reflector, is located at the concave side, and hence adjacent the reflective surface of the reflector, and at a predetermined position with respect to the reflector to position the lamp in aligned predetermined relationship with respect to the reflective surface of the reflector upon assembly of the carrier element to the reflector with the seating surface (45) on the lamp carrier element fitting against the locating surface (25) formed by the abutment on the reflector at the inner region of the concave reflector.

2. Headlamp according to claim 1, wherein the lamp carrier element is a disk (3).

3. Headlamp according to claim 1, wherein (FIG. 5) the lamp carrier element is a ring (4).

4. Headlamp according to claim 1, wherein the lamp carrier element is made of at least one of the materials comprising the group consisting of: glass, plastic, ceramic.

5. Headlamp according to claim 1, wherein the lamp is a halogen cycle incandescent lamp having at least one filament positioned transversely to the longitudinal axis of the lamp.

6. Headlamp according to claim 1, wherein the lamp (1) is a halogen cycle incandescent lamp having at least one filament positioned at an angle other than zero with respect to the longitudinal axis of the lamp.

7. Headlamp according to claim 1, wherein the lamp carrier element (3, 4) and the reflector (2) are adhesively secured together at the respective seating surface and locating surface.

8. Headlamp according to claim 1, wherein the lamp carrier element (3, 4) and the reflector are secured together by form-fitting engagement of the seating surface (45) and of the locating surface (25), respectively.

9. Head lamp according to claim 1, wherein the seating surface (45) of the lamp carrier element is bonded to the locating surface (25) of the reflector.

10. Method of making a sealed-beam headlight having a concave reflector (2) having an open or front end, and converging towards an inner end, and having a reflective surface at the inner, or concave side thereof, and in incandescent lamp (1) positioned within the reflector to provide for accurate alignment of the filament of the lamp with respect to the reflector wherein
- a lamp carrier element (3, 4) having a seating surface (45) is provided comprising the steps of
- forming a locating surface (25) at the inner, concave side of the reflector, located at a predetermined position with respect to the reflective surface of the reflector and dimensioned and shaped to match and to receive the seating surface (45) on the lamp carrier element;
- placing the lamp carrier element (3, 4) in a holder (*6b*) having a locating surface matching the locating surface (25) on the reflector (2);
- optically adjusting the position of the lamp (1) with respect to the carrier element (3, 4) by effecting relative movement (H, V, L, R) of the lamp and the holder, and hence of the carrier element;

sealing the lamp (1) to the carrier element (3, 4) when a predetermined adjusted position is reached to form a lamp-carrier subassembly;

and assembling the lamp-carrier subassembly into the reflector by inserting the subassembly from the open, or front end towards the inner end of the reflector and seating the seating surface on the carrier element against the locating surface on the reflector to thereby position the lamp in the optically adjusted predetermined position within the reflective surface of the reflector.

11. Method according to claim 10, further comprising the step of bonding the lamp carrier subassembly to the reflector, with the seating surface (45) of the carrier positioned on the locating surface (25) of the reflector.

* * * * *